July 11, 1967
G. L. RODGERS
3,330,047
DRYER CONTROL
Filed June 10, 1964
4 Sheets-Sheet 1
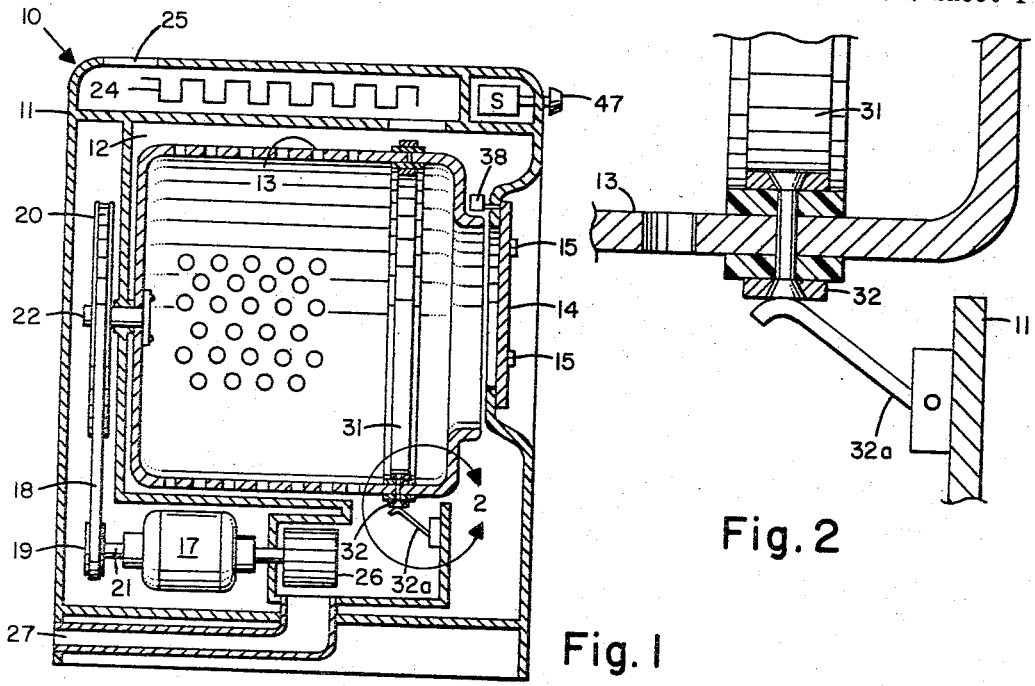
Fig. 2
Fig. 1
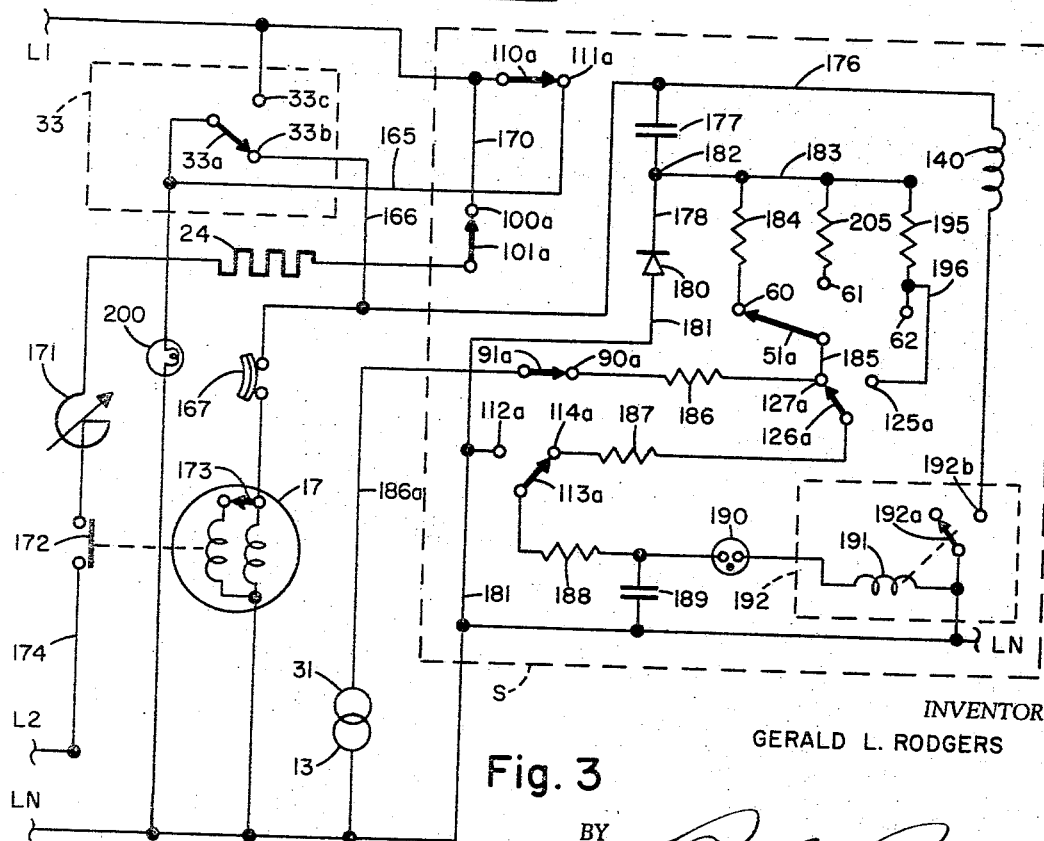
Fig. 3
INVENTOR
GERALD L. RODGERS
BY
ATTORNEY

INVENTOR
GERALD L. RODGERS

BY
ATTORNEY

INVENTOR
GERALD L. RODGERS

July 11, 1967
G. L. RODGERS
3,330,047
DRYER CONTROL
Filed June 10, 1964
4 Sheets-Sheet 4
Fig. 8a
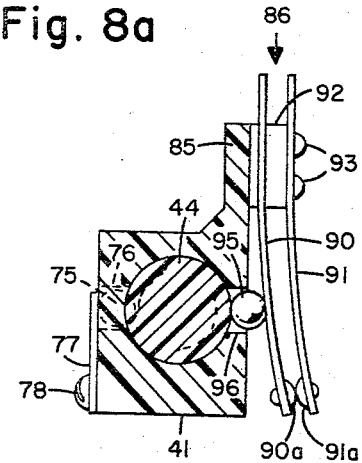
Fig. 8b
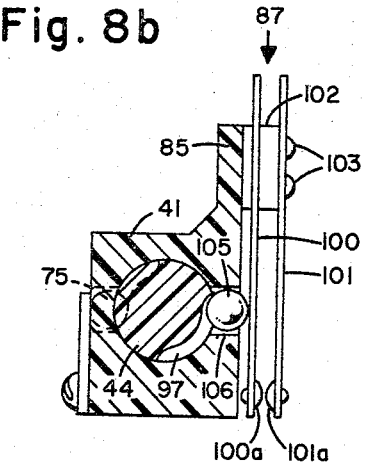
Fig. 8c
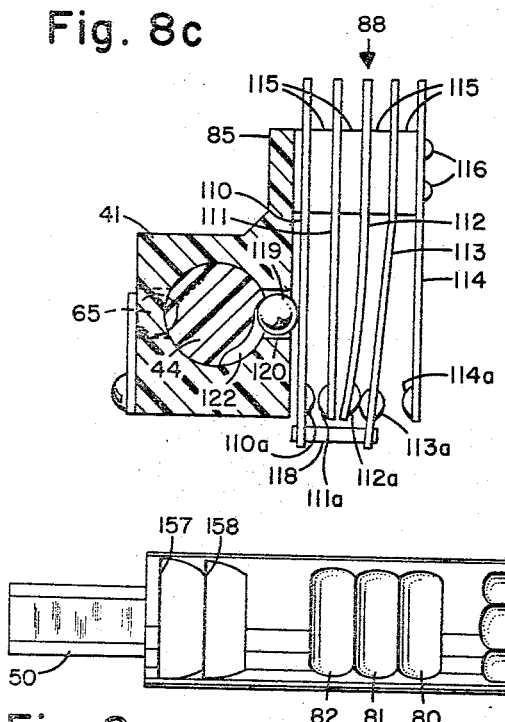
Fig. 8d
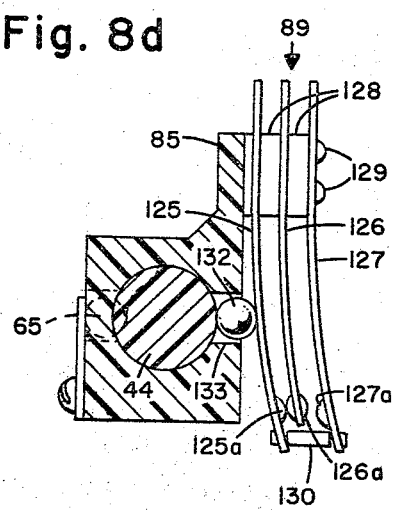
Fig. 9
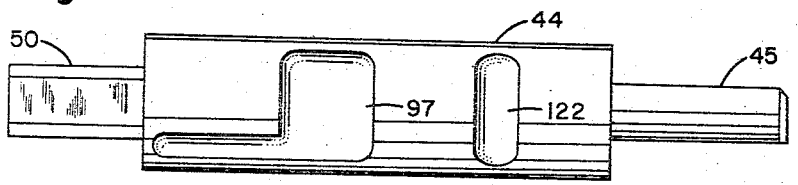
Fig. 10
INVENTOR
GERALD L. RODGERS
BY
ATTORNEY

United States Patent Office 3,330,047
Patented July 11, 1967

3,330,047
DRYER CONTROL
Gerald L. Rodgers, Worthington, Ohio, assignor to Ranco Incorporated, Columbus, Ohio, a corporation of Ohio
Filed June 10, 1964, Ser. No. 373,947
5 Claims. (Cl. 34—45)

This invention relates to automatic controls for clothes dryers and the like, and more particularly to improved dryer control means for effecting control functions in response to predetermined conditions of dryness and/or passage of time.

It is one object of this invention to provide improved dryer control means which automatically terminates a drying cycle when the moisture content of articles being dried is reduced to a predetermined level as sensed by a novel control circuit embodying the invention.

Another object of this invention is the provision of an improved control means which is capable of performing a sequence of control functions in response to different sequential conditions, for example at the termination of a heated drying cycle in response to a predetermined condition of dryness, the control means initiates a cooling cycle which is terminated after passage of a predetermined time.

As another object this invention aims to provide a novel and improved clothes dryer control of the foregoing character comprising a control circuit including moisture sensing means adapted to be contacted by the clothes in the dryer so that the clothes form an electrical current path, the resistance of which increases in proportion to decreases in moisture, the sensing means forming part of a voltage divider network supplied with direct current so as to apply a voltage across a capacitor which increases in proportion to decreases in moisture, the circuit including voltage controlled means such as a gas filled discharge tube or neon bulb which becomes conductive to pass current when the voltage exceeds a predetermined level, thereby energizing a control relay which terminates the drying cycle and initiates a cooling period which is determined by the time required to charge the capacitor through other resistance means to the predetermined voltage level, whereupon the control relay is again energized and terminates the cooling period.

Yet another object is the provision, in a dryer control circuit of the foregoing character, of a novel solenoid actuated switch comprising a plurality of circuit conditioning contact means and a cam member which is movable to a plurality of function or program selecting positions and is shiftable manually and by solenoid means for initiating and terminating selected functions or programs of functions.

Other objects and advantages of the invention will become apparent from the following description of a preferred embodiment thereof, read in conjunction with the accompanying sheets of drawings forming a part of this specification, and in which:

FIG. 1 is a vertical sectional illustration of a clothes dryer embodying control means of this invention;

FIG. 2 is an enlarged fragmentary sectional view taken within circular line 2 of FIG. 1;

FIG. 3 is a schematic illustration of a control circuit embodying this invention;

Figure 7:
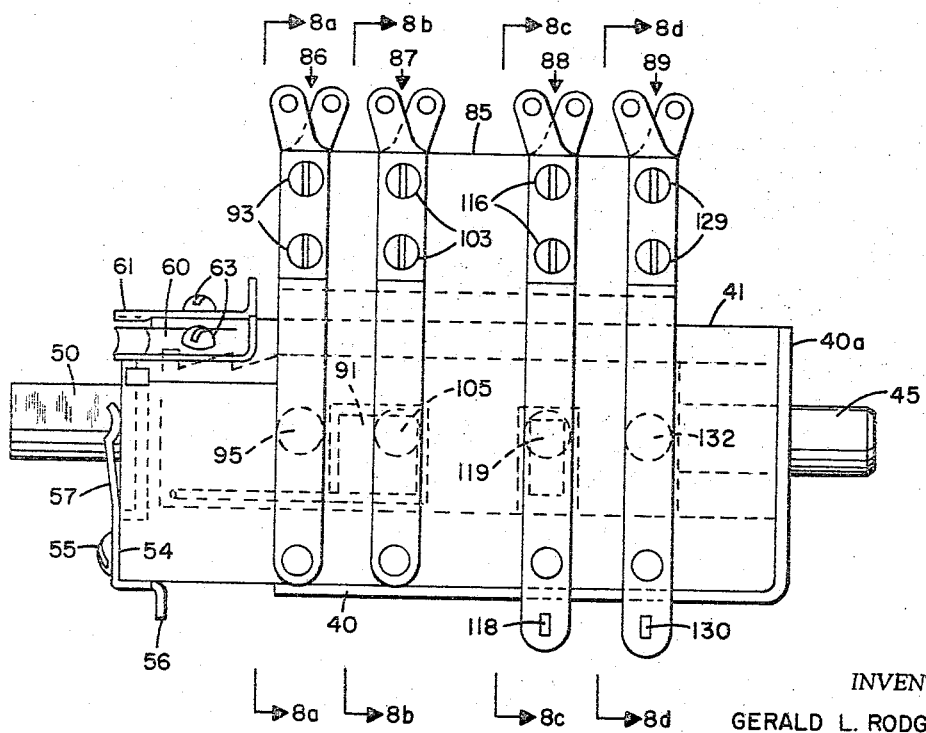
FIG. 7 is a side elevational view of the control switch as viewed along line 7—7 of FIG. 4.

FIGS. 8a, 8b, 8c and 8d are sectional views on a reduced scale taken substantially along the respective section lines 8a—8a, 8b—8b, 8c—8c, and 8d—8d of FIG. 7;

FIG. 9 is a top elevational view of a cam member forming part of the control switch; and FIG. 10 is a bottom elevational view of the cam member.

In the drawings, there is illustrated an example of a conventional domestic clothes dryer 10 of a type with which the invention may be used to advantage. The dryer 10 comprises a cabinet 11 having an inner chamber 12 in which is rotatably supported a perforate drum 13. The drum 13 may be loaded with clothes to be dried through an access door 14 which is hinged at 15 to the cabinet 11.

Rotation of the drum 13 is effected by a drive motor 17 which is operably connected to the drum through suitable transmission means such as a belt 18 and pulleys 19 and 20 which are secured on the motor and drum shafts 21 and 22, respectively. Heating means, such as an electrical resistance type heater 24, or its equivalent, is provided to heat air drawn through an intake opening 25, over the heater 24, into the chamber 12, through the drum 13 and out an exhaust duct 27 by a suitable blower or fan 26 which is conveniently driven by the motor 17.

Energization of the motor 17 and of the heater 24 is controlled by a control circuit 30 (FIG. 3) including a function selector switch generally indicated as S in FIGS. 1 and 3. The function selector switch S is provided with a control knob 47 which may be manually rotated by the operator to any of three positions to select any one of three operating modes, namely, "dry," "damp dry," or "air fluff." When this selection has been made, the knob 47 is pulled out to start the operation of the dryer 10.

In the case of dry or damp dry, air drawn through the rotating drum 13 is heated by the heater 24 until the clothes are dry or damp dry as sensed by clothing moisture sensing means forming part of the circuit 30. In this example the clothing moisture sensing means comprises the metal clothes drum 13 as one conductive sensor element, and a second conductive sensor element 31 which is conveniently in the form of a band disposed within the drum 13 and electrically insulated therefrom as is best shown in FIG. 2. The sensor element 31 is electrically connected to a slip ring 32 mounted about the drum 13 for rotation therewith, and is in sliding contact with a suitable brush 32a supported by the frame 11. The drum 13 and the other sensor element 31 are in close, predetermined spaced relation and when they are bridged by an article, such as cloth, the moisture, if any, in the cloth forms an electric path therebetween and the resistance of the path is inversely proportional to the amount of moisture present. When the clothes have reached their desired degree of dryness, the control circuit automatically terminates the energization of the heater 24 but maintains energization of the motor 17 for a predetermined cooling down period during which air at room temperature is drawn through the drum 13. At the end of the cooling down period the motor 17 is deenergized, terminating operation of the dryer 10 automatically.

In order to permit safe inspection of clothes in the dryer or addition or removal of clothes therefrom during the drying process, a door operated switch 33 is provided which interrupts energization of the heater 24 and the motor 17 upon opening of the door 14.

Referring now to FIGS. 4–7, the function selector switch S comprises a base plate 40 which is conveniently formed of sheet metal or the like, and comprises a flange 40a extending along one edge thereof. Mounted on the base plate 40 is an elongated switch body 41 having a cylindrical bore 42, the axis of which extends normal to the flange 40a. Rotatably and reciprocably disposed in the bore 42 of the body 41 is a generally cylindrical cam member 44 having at one end an operating stem 45. The stem 45 extends through an opening 46 in the flange 40a and has secured thereon the knob 47.

Figures 4, 5:
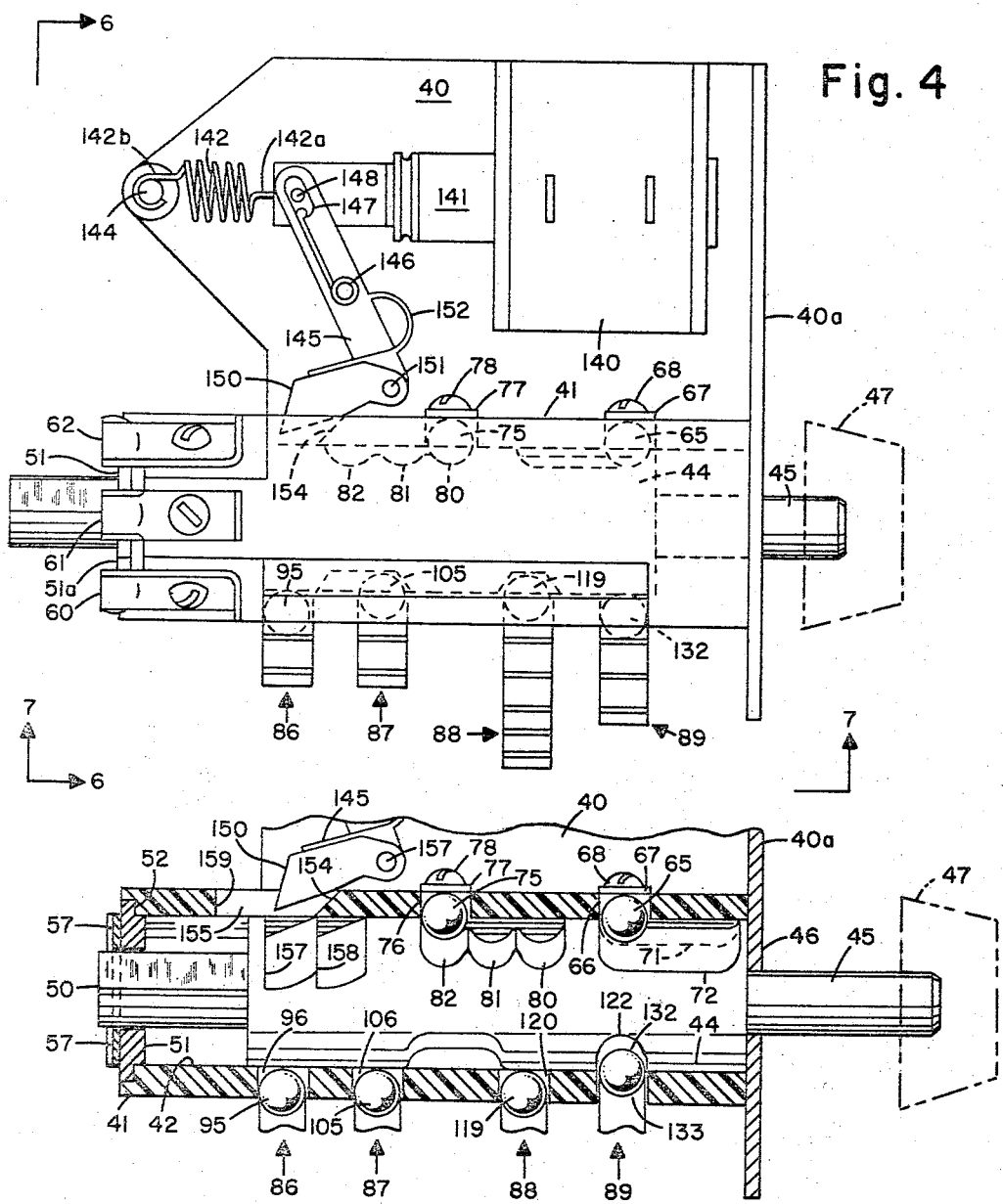
FIG. 4 is a plan view of a function selector switch device forming a part of the control circuit.
FIG. 5 is a fragmentary sectional view of the control switch of FIG. 4.
Figure 6:
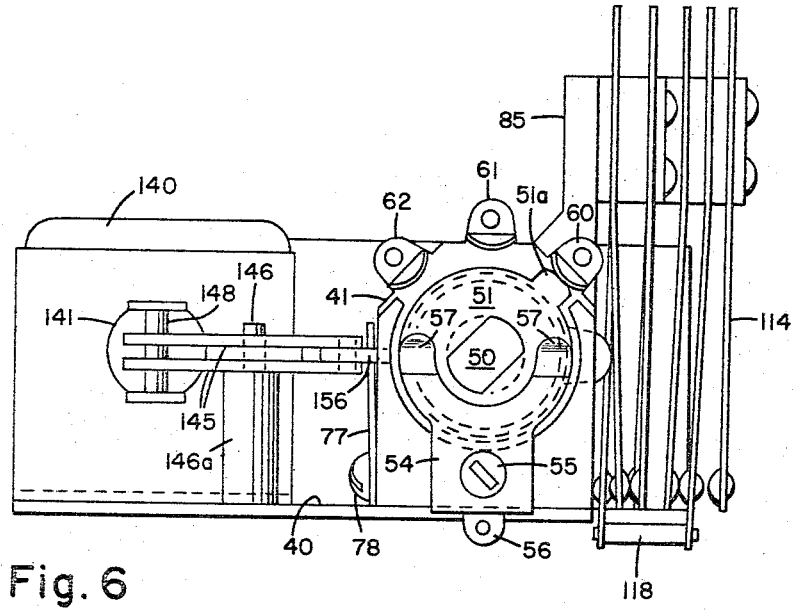
FIG. 6 is an end view of the control switch as viewed along line 6—6 of FIG. 4.

A shaft 50 of non-circular cross section extends from the other end of the cam member 44 and through a complementary opening in a disc like contact member 51 having a contactor lug 51a on the periphery thereof. The contact member 51 is rotatably seated in a counter-bore 52 of the switch body 41 and is retained therein by a resilient wiper member 54 which is best illustrated in FIG. 6. The wiper member 54 is secured to the body 41 by a screw 55 and is conveniently formed of a conductive spring metal such as beryllium copper having at one end an electrical terminal connection 56 and at the other end of a pair of arcuate fingers 57 bearing against the rotatable contact member 51. The non-circular shaft 50 and complementary opening in the member 51 permits axial movement of the cam member in bore 42 and connects the member 51 to the cam member for rotation therewith irrespective of the axial position of the cam member.

The cam member 44 is rotatable by means of knob 47 between three positions for selecting the previously mentioned drying functions, e.g., "dry," "damp dry" or "air fluff," as is more fully described hereinafter. Because of the non-circular configuration of shaft 50, the contact members 51 is rotatable with the cam member between three positions whereby the contactor lug 51a is selectively engageable with each of three electrical contacts 60, 61 and 62 which are secured by screws 63 to the switch body 41. Cam member 44 is frictionally retained in each of its three rotative positions corresponding to engagement of the contact member 51 with contacts 60, 61 or 62, by detent means comprising a ball 65 movably disposed in opening 66 in the switch body 41 and biased inwardly of the bore 42 by a leaf spring 67 which is secured to the body 41 by a screw 68. The ball 65 is cooperable with three grooves 70, 71 and 72 formed in the cam member 44 to retain the cam member and the contactor lug 51a in selected ones of their three rotative positions, while permitting the cam member 44 to be reciprocated in the bore 42 to any of three axial positions including a left hand position illustrated in FIG. 4, and intermediate position, and a right hand position illustrated in FIG. 5.

Detent means are provided for retaining the cam member 44 in any of these three positions of reciprocation, and comprise a detent ball 75 movably disposed in an opening 76 in the body 41 and pressed inwardly of the bore 42 by a leaf spring 77 which is secured to the body by a screw 78. The ball 75 is cooperable with three grooves 80, 81 and 82 in the cam member 44 to retain the cam member in any one of its three axial positions.

Mounted on the end of an arm 85 of the switch body 41 are four switch blade groups 86, 87, 88 and 89, which are actuated by movement of the cam member 44. The group 86, best illustrated in FIG. 8a, comprises resiliently flexible spring metal conductive switch blades 90 and 91 which are separated by an insulator 92 and are secured to the body arm 85 as by screws 93. The blades 90 and 91 carry contacts 90a and 91a which tend to be separated by the inherent resiliency of the switch blades. A ball 95 is movably disposed in an opening 96 of the switch body 41 and cooperates with the cam member 44 to control closing and opening of the contacts 90a, 91a. In this regard, the cam member 44 comprises an L-shaped recess 97 (FIG. 10) into which the ball 95 may move to permit opening of the contacts 90a, 91a in certain predetermined positions of the cam member.

The second group 87 of switch blades, as seen in FIG. 8b, comprises spring blades 100 and 101 separated by an insulator block 102 and secured by screws 103 to arm 85 of the body 41. The blades 100 and 101 carry contacts 100a and 101a, which are normally separated by the blades and opening and closing movements of which are controlled by a ball 105 which is movably disposed in an opening 106 of the body member. The ball 105, like ball 95, is actuated by the walls of recess 97 so as to move outwardly or inwardly and cause closing and opening of the contacts 100a, 101a respectively in accordance with predetermined positioning of the cam member 44.

The switch blade group 88, as shown in FIG. 8c, comprises blades 110, 111, 112, 113 and 114, separated by insulator blocks 115 and secured to the switch body arm 85 as by screws 116. These blades carry contacts 110a, 111a, 112a, 113a and 114a, respectively. Blades 110 and 113 are interconnected by an insulating spacer 118 so as to move in unison by a ball 119 which is movably disposed in an opening 120 in the switch body 41 and is moved by the camming action of the walls of a recess 122 (FIG. 10) in the cam member 44 when the cam member is shifted axially. When the cam 44 is positioned with the ball 119 in the recess 122, the contacts 112a, 113a are closed by the bias of blades 110 and 113 while contacts 110a, 111a and 114a are opened. Conversely, when the cam member 44 is positioned so that ball 119 is displaced from recess 122, the ball moves blades 110 and 113 to the right, as viwed in FIG. 8c so that contacts 112a, 113a are opened, while contacts 110a, 111a and 113a, 14a are closed.

As seen in FIG. 8d, the switch blade group 89 comprises switch blades 125, 126 and 127 separated by insulator blocks 128 and secured as by screws 129 to the arm 85 of switch body 41. Blades 125, 126 and 127 carry contacts 125a, 126a and 127a, respectively and blades 125 and 127 are interconnected by an insulating spacer 130 to be moved in unison and these blades are biased to close contact 126a and 127a and open 125a and 126a. The blades 125 and 127 are moved in unison to the right to close contacts 125a, 126a and open contacts 126a, 127a by a ball 132 which is movably disposed in an opening 133 in the switch body 41 and which is shifted into and out of recess 122 when the cam member is reciprocated to and from its extreme right hand position.

The control switch S further comprises means for stepping the cam member 44 from its right hand or "operate" position to the intermediate or "cool down" position, and then to its left hand or "off" position. To this end there is provided actuator means comprising a solenoid 140 having an armature 141, the solenoid being mounted on the base plate 40 and forming part of the circuit 30. The armature 141 is normally biased to its illustrated extended position by a spring 142 having one end 142a connected to the armature and the other end thereof anchored by a post 144 on the base plate.

A lever 145 is pivoted at 146 to a post 146a on the base plate 40, and is provided at one end with a slot 147 slideably receiving a pin 148 carried by armature 141. On the other end of lever 145 there is a pawl 150, pivoted thereto as at 151. The pawl 150 is biased by a spring 152 into engagement with a cam surface 154 at one end of an opening 155 communicating with the bore 42 of switch body 41. The opening 155 is aligned with ratchet grooves having shoulders 157, 158 formed in the surface of cam member 44.

When the cam member is in the extreme right hand position with ball 75 seated in groove 82, energization of the solenoid 140 to retract armature 141 will cause the pawl 150 to be extended through the opening 155 into engagement with shoulder 157 and to drive the cam member to an intermediate position with ball 75 seated in groove 81. The stroke of pawl 150 is limited by the end surface 159 of opening 155. When the solenoid 140 is deenergized, the pawl is retracted and rides onto cam surface 154 and clear of the cam member 44. A subsequent energization of the solenoid 140 will extend the pawl 150 into engagement with shoulder 158 and drive the cam 44 to its left hand position, with ball 75 seated in groove 80. Again, upon deenergization of solenoid 140, the pawl 150 will be retracted clear of the cam member 44.

Assuming the operator wishes to perform a drying operation on wet clothes in the drum 13 of dryer 10, the cam member 44 is rotated by control knob 47 to bring contact 51a in engagement with contact 60 with ball 65 seated in groove 70, and then knob 47 is pulled out to shift the cam member 44 to the right in bore 42 until detent ball 75 seats in groove 82. These movements of cam member 44 cause the balls 95, 105, 119 and 132 to move their associated switch blade contacts from the "off" positions illustrated in FIGS. 8a–8d to the operating positions illustrated in the circuit diagram of FIG. 3.

A circuit may be traced from power line L1, of a conventional three wire 230 v. AC domestic system for example through contacts 110a, 111a, conductor means 165, contacts 33a, 33b of door switch 33, a conductor 166, a thermal motor protector 167, and the field windings of motor 17 to a neutral or ground power line LN. The motor 17 is thereby energized ot drive the dryer drum 13 and the fan 26. An energizing circuit for the heater 24 may be traced from the power line L1 through a conductor 170, contacts 100a, 101a, resistance heater 24, a thermostat 171, the contacts 172, which are closed upon opening of starting winding contacts 173 of the motor 17, and a conductor 174 to power line L2. The heater 24 is thereby energized to heat air being drawn through the drum 13 by the fan 26 to effect drying of the clothes at a temperature determined by thermostat 171.

A rectifying circuit may be traced from power line L1 through the door switch 33, conductor 166, a conductor 176, a capacitor 177, a conductor 178, a diode rectifier 180, and a conductor 181 to ground power line LN. This circuit provides a source of direct current potential at junction 182 between the capacitor and the diode.

The direct current potential is applied from junction 182 through a conductor 183 to a moisture responsive voltage divider circuit portion of the circuit 30. This voltage divider circuit may be traced from junction 182 through conductor 183, a resistor 184, contacts 60, 51a, conductor 185, contact 127a, a resistor 186, contacts 90a, 91a, a conductor 186, the sensor 31 and drum 13 to ground, this circuit including, of course any more or less conductive material such as moist clothing bridging the sensor 31 and drum 13.

It will be seen that the voltage at contact 127a will increase with increases in the resistance path through clothes bridging the sensor 31 and the drum 13 as the clothes dry. The contact 127a is connected by contact 126a, a resistor 187, contacts 114a, 113a, a resistor 188, and a capacitor 189 to ground line LN. It will also be seen that the voltage across the capacitor 189 will increase in accordance with increases in electrical resistance of clothes being dried in the drum 13.

Connected in series across the capacitor 189 are a neon bulb 190, or an equivalent voltage controlled conductor such as a voltage regulating gas filled discharge tube, and a solenoid 191 of a relay 192 having normally opened contacts 192a and 192b. The values of resistances 184, 186, 187, 188, capacitor 189, and the firing voltage of neon bulb 190 are so chosen that when the clothes are dried to a predetermined degree of dryness, the increased resistance of the clothes will result in a voltage across capacitor 189 which exceeds the firing voltage of the neon bulb 190 which will become conductive and energize relay solenoid 191. Energization of the relay solenoid 191 effects closing of the contacts 192a, 192b, thereby completing a circuit from power line L1 through contacts 110a, 111a, through door switch 33, conductors 166, 176, stepping solenoid 140, and the contacts 192a, 192b to the ground line LN.

Energization of the stepping solenoid 140 causes the pawl 150 to shift the cam member 44 from its right hand position to its intermediate position with detent ball 75 engaged in groove 81. This movement of the cam member 44 effects opening of contacts 100a, 101a to deenergize heater 24. In addition, the cam member movement effects opening of contacts 90a, 91a, opening of contacts 126a, 127a, and closing of contacts 126a, 125a to terminate the moisture responsive character of the circuit and condition it to perform a time delay function in determining a cooling off period during which unheated air is drawn through the drum 13.

When the circuit 30 is so conditioned, a circuit may be traced from the direct current supplying rectifier 180 through conductor 183, a resistor 195, conductor means 196, contacts 125a, 126a, resistor 187, contacts 113a, 114a, and resistor 188 to capacitor 189. The just mentioned resistors are so chosen that a predetermined time period will elapse before the capacitor 189 is charged to a voltage sufficient to fire the neon bulb 190. This predetermined period, which may be on the order of a number of minutes, permits the unheated air being drawn through the drum 13 to cool the clothes and drum to a temperature which is comfortable for handling.

At the end of the cooling off period, when the capacitor 189 has charged sufficiently to fire neon bulb 190, the solenoid 191 is again energized closing contacts 192a, 192b and energizing actuator stepping solenoid 140. Energization of the solenoid 140 causes the pawl 150 to shift the cam member from its intermediate position to its left hand position with the detent ball 75 engaged in detent groove 80. This movement of the cam member 44 returns the contacts of switch S to the positions illustrated in FIGS. 4 and 8, thereby terminating energization of the motor 17.

The drum 31 is conveniently provided with a lamp 200 which may or may not be of the germicidal type, and which, during operation of the dryer 10, is lighted by virtue of its connection between conductor 165 and power line LN. In order to provide illumination for the drum 13 when loading or removing clothing, opening of the door closes door switch contacts 33a, 33c and lamp energizing current flows directly from power line L1 through the lamp 200 to the power line LN. Although closing of contacts 33a, 33c effectively by-passes contacts 110a, 111a, there will be no charging of the capacitor 189 or firing of the neon bulb 190, since movement of the cam member 44 to the off position opens contacts 113a, 114a, and closes contacts 113a, 112a to remove any charge which may remain on the capacitor 183.

When it is desired to dry a load of clothes only to a damp dry state in preparation for subsequent ironing, the control knob 47 is turned by the operator to rotate the cam member 44 into a position wherein detent ball 65 is engaged in groove 71, and contactor member 51 is positioned with contact 51a engaging the contact 61, which action substitutes a resistor 205 in the voltage divider circuit in place of resistor 184. The value of the resistor 205 is lower than that of resistor 184 and is such that the firing voltage for the neon bulb 190 is reached when the moisture sensing means 31, 13 sense a degree of dryness in the clothes which is suitable for ironing, usually referred to as "damp dry" and more moist than when resistor 184 is in the circuit. Upon firing of the neon bulb 190, the relay solenoid 191 is energized to effect energization of stepping solenoid 140, and the cam member 44 is stepped to its intermediate position, terminating the drying cycle and initiating a cooling off period as described hereinbefore.

In some instances it is desirable to operate the clothes dryer without heating the air being drawn through the drum 13 for air fluffing bedding or freshening garments. To accomplish this, the knob 47 is rotated to the "air fluff" position in which the cam member 44 is positioned with the detent ball 65 engaged in groove 72, and the contact 51a is in conductive engagement with contact 62. After the clothes are loaded in the drum 13, the knob 47 is pulled to shift the cam member to its operate position in which detent ball 75 is engaged in groove 82 to initiate operation of "air fluff" cycle. Rotation of the cam member 44 to the air fluff position opens the contacts 90a, 91a and opens contacts 100, 101a, which contacts remain open while contacts 110a, 111a are closed to energize the drum and fan operating motor 17. Because the contacts 90a, 91a remain open, and contactor 51a engages contact 62, the time required to charge capacitor 189 to a voltage sufficient to fire neon bulb 190 will be determined by the values of resistors 195, 187 and 188. By making the resistance of resistor 195 sufficiently large, a substantial time period will be required before the neon bulb 190 fires to energize relay solenoid 191 and close contacts 192a, 192b for energization of stepping solenoid 140 which shifts the cam member to its intermediate position with detent ball 75 engaged in groove 81. This movement of the cam member opens contacts 126a, 127a and closes contacts 126a, 125a while leaving the other switch contacts in their aforementioned positions and, because the capacitor 189 has been discharged through the neon bulb 190, a second time period will be required to recharge the capacitor to a voltage which will again fire the neon bulb 190 to effect operation of relay 192, and stepping of the cam member to its off position to terminate the air fluff cycle.

From the foregoing detailed description it will be recognized that the dryer control embodying this invention provides a variety of programs of functions which are terminated in response to a combination of moisture and time conditions or time conditions alone. It will also be recognized that this is accomplished through the use of relatively inexpensive and reliable electronic components.

Although the invention has been described in considerable detail and with reference to the specific clothes dryer control embodying the invention, it will be understood that the invention is not limited thereto, but rather the invention includes all those modifications, adaptations, substitutions, and uses as are reasonably embraced by the scope of the claims hereof.

Having thus described my invention, I claim:

1. Control apparatus for a drying mechanism having first means operative to pass heated air over materials to be dried and second means operative to tumble the material to be dried, said control apparatus being operable to terminate operation of said first and second means successively in response to predetermined electric signals and comprising:
    (a) means to produce said electric signals for actuating said control means and comprising a capacitor, a first capacitor charging circuit including two resistances in series, one of said resistances being variable in response to variation of the amount of moisture in the material to be dried, a second capacitor charging circuit including additional resistance means, and means to impress direct current voltage across said circuits,
    (b) voltage responsive actuator means responsive to an accumulation of a predetermined electrical charge on said capacitor to actuate said control means, and
    (c) switching means to alternatively connect said first and second capacitor charging circuits to said capacitor, said switching means being operated by said acutator means to disconnect said capacitor from said first circuit and to connect it with said second circuit to effect successive operation of said actuator means.

2. A control apparatus as defined in claim 1 wherein said means to produce said electrical signals further includes voltage controlled conductor means operative to conduct in response to said accumulation of said predetermined electrical charge on said capacitor and effective to energize said voltage responsive actuator means when in said conducting condition.

3. A dryer control circuit as defined in claim 2, and wherein said voltage controlled conductor means comprises a gas filled discharge tube.

4. A dryer control circuit as defined in claim 2, and wherein said voltage controlled conductor means comprises a neon bulb.

5. A control circuit for effecting a control function in response to a predetermined moisture content of articles, said circuit comprising a source of electric power, resistance means for providing an output signal voltage which varies in response to the moisture content of articles being dried, said resistance means including first and second resistance elements connected in series to form a voltage divider with the resistance of one of said resistance elements varying in response to moisture content of articles being dried to provide said signal voltage, voltage controlled conductor means connected to said resistance means, said voltage controlled conductor means having a high resistance to current flow at voltages below a predetermined voltage and operable to break down and conduct at said predetermined voltage, said voltage controlled conductor means breaking down and conducting in response to a predetermined signal voltage of said resistance means, and function control means connected in series with said voltage controlled conductor means for effecting a control function of said circuit, said function control means being energized by current conducted by said voltage controlled conductor means and operative when said voltage controlled conductor means conducts, a capacitor connected to said voltage controlled conductor means and said resistance means, said capacitor being charged by said signal voltage and operable to cause said voltage controlled conductor means to conduct and energize said function control means when the charge on said capacitor reaches said predetermined voltage, and switch means operable between a first position wherein said capacitor and said voltage controlled conductor means are connected to said resistance means and a second position wherein said voltage controlled conductor means and said capacitor are connected to a third resistance element, said third resistance element connected to said source through said switching means and said capacitor and said third resistance cooperating to provide a time delay build-up of voltage at said voltage controlled conductor means, said voltage controlled conductor means operable to conduct when said voltage reaches said predetermined voltage and energize said function control means.

References Cited

UNITED STATES PATENTS

| | | | |
|---|---|---|---|
| 2,775,047 | 12/1956 | Morrison | 34—45 |
| 3,180,038 | 4/1965 | Chaffee | 34—45 |
| 3,197,884 | 8/1965 | Smith | 34—45 |
| 3,200,511 | 8/1965 | Smith | 34—45 |
| 3,210,863 | 10/1965 | Nye et al. | 34—45 |
| 3,229,381 | 1/1966 | Chaffee | 34—45 |
| 3,266,167 | 8/1966 | Finnegan | 34—45 |
| 3,271,876 | 9/1966 | Behrens | 34—45 |

FREDERICK L. MATTERSON, JR., *Primary Examiner.*

JOHN J. CAMBY, *Examiner.*